(12) United States Patent
Setlock et al.

(10) Patent No.: US 9,776,130 B1
(45) Date of Patent: Oct. 3, 2017

(54) GENERATION OF HIGH PRESSURE OXYGEN VIA ELECTROCHEMICAL PUMPING IN A MULTI-STAGE ELECTROLYSIS STACK

(71) Applicant: The United States of America as represented by the Administrator of the National Aeronautics and Space Administration, Washington, DC (US)

(72) Inventors: John A Setlock, Grafton, OH (US); Robert D Green, North Olmsted, OH (US); Serene Farmer, Sagamore Hills, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 15/144,214

(22) Filed: May 2, 2016

Related U.S. Application Data (63) Continuation of application No. 14/300,628, filed on Jun. 10, 2014, now Pat. No. 9,358,501.

(51) Int. Cl.
  *B01D 53/32* (2006.01)
  *C25B 1/02* (2006.01)
  *C25B 9/08* (2006.01)
  *C25B 9/20* (2006.01)
  *B01D 71/02* (2006.01)

(52) U.S. Cl.
  CPC ......... *B01D 53/326* (2013.01); *B01D 71/024* (2013.01); *C25B 1/02* (2013.01); *C25B 9/08* (2013.01); *C25B 9/20* (2013.01); *B01D 2256/12* (2013.01); *B01D 2257/80* (2013.01); *B01D 2259/4575* (2013.01); *B01D 2259/80* (2013.01)

(58) Field of Classification Search
  CPC .... C25B 1/02; C25B 9/18; C25B 9/20; B01D 53/326
  See application file for complete search history.

(56) References Cited

U.S. PATENT DOCUMENTS 6,264,807 B1 * 7/2001 Fenner ................. B01D 53/326
                                                          204/252
9,358,501 B1 * 6/2016 Setlock ..................... C25B 1/02

* cited by examiner

*Primary Examiner* — Nicholas A Smith
(74) *Attorney, Agent, or Firm* — Robert H. Earp, III (57) ABSTRACT

An oxygen pump can produce high-purity high-pressure oxygen. Oxygen ions ($O^{2-}$) are electrochemically pumped through a multi-stage electrolysis stack of cells. Each cell includes an oxygen-ion conducting solid-state electrolyte between cathode and anode sides. Oxygen dissociates into the ions at the cathode side. The ions migrate across the electrolyte and recombine at the anode side. An insulator is between adjacent cells to electrically isolate each individual cell. Each cell receives a similar volt potential. Recombined oxygen from a previous stage can diffuse through the insulator to reach the cathode side of the next stage. Each successive stage similarly incrementally pressurizes the oxygen to produce a final elevated pressure.

12 Claims, 4 Drawing Sheets

GENERATION OF HIGH PRESSURE OXYGEN VIA ELECTROCHEMICAL PUMPING IN A MULTI-STAGE ELECTROLYSIS STACK

CROSS REFERENCE TO RELATED APPLICATION

This application is a Continuation of U.S. Non-Provisional application Ser. No. 14/300,628 filed on Jun. 10, 2014, Patent pending, which claims the benefit of Provisional application 61/834,927 filed Jun. 14, 2013, which is herein incorporated by reference in its entirety.

ORIGIN OF THE INVENTION

The invention described herein was jointly made by employees of the United States Government and may be manufactured and used by or for the Government for Government purposes without the payment of any royalties thereon or therefore. The invention described herein was also jointly made in the performance of work under a NASA contract and is subject to the provisions of National Aeronautics and Space Act, Public Law 111-314, §3 (124 Stat. 3330, 51 U.S.C. Chapter 201).

BACKGROUND OF THE INVENTION

High-pressure oxygen is used in many applications, including space applications, medical applications, and industrial applications. A wide range of such applications may benefit from improvements in producing high-pressure oxygen.

SUMMARY OF THE INVENTION

An exemplary embodiment of the invention is directed to an apparatus and a method that can produce high-pressure oxygen.

An exemplary embodiment is directed to an oxygen pump apparatus that can extract oxygen from ambient air, carbon dioxide, and/or water, and then provide the oxygen at high pressure.

An exemplary embodiment is directed to an apparatus that can produce substantially pure dry high-pressure oxygen.

An exemplary embodiment is directed to an apparatus that can produce high-purity dry high-pressure oxygen via an electrochemical pumping process.

An exemplary embodiment includes a high-pressure oxygen generator that comprises a multi-stage stack of cells, where each cell includes an oxygen ion-conducting solid-state electrolyte membrane sandwiched between cathode and anode layers, where each stage can incrementally pressurize oxygen.

An exemplary embodiment includes a method of using the apparatus.

DETAILED DESCRIPTION OF EXEMPLARY EMBODIMENTS

It will be readily understood that the features of exemplary embodiments may be arranged and designed in a wide variety of different configurations. Thus, the following detailed description of the exemplary embodiments of apparatus and method is not intended to limit the scope of the invention as claimed, but is merely representative of selected exemplary embodiments that implement the principles described herein.

The features, structures, and/or characteristics described herein may be combined in any suitable manner in one or more embodiments or arrangements. That is, a particular feature, structure, or characteristic described in connection with one embodiment may be included in at least one other embodiment or arrangement.

An exemplary embodiment is directed to an apparatus and method for generating high-purity high-pressure oxygen. The high-pressure oxygen is achieved by using electrochemical pumping in a multi-stage electrolysis stack of cells.

An oxygen pressurizer includes a cylindrical pressure containment chamber (or shell) that houses the multi-stage electrolysis stack of cells. In an exemplary embodiment the stack has a cylindrical configuration. Each cell also comprises a cylindrical (disk) configuration. In other embodiments other configurations may be used. The chamber is arranged to receive oxygen-containing fluid (gas or gases) through one or more inlets located at a first (inlet or entrance) chamber end. The chamber also includes one or more outlets at the other (outlet or discharge) chamber end. The inlet and outlet structure can comprise a suitable passageway (or aperture or channel) through the chamber housing that allows oxygen content to flow therein. The inlet structure allows for a continuous stream of oxygen-containing intake gas to flow to a stack entry area while also allowing the residual intake gas to be removed or exhausted. The exemplary outlet structure allows for separated and highly pressurized oxygen to be removed or exhausted from the chamber housing. Different embodiments can include different numbers of inlets and outlets. Also, a chamber housing arrangement may include only one inlet and one outlet. Furthermore, as discussed in more detail later, in some embodiments the chamber housing may not include a designated inlet. Rather, the stack entry area can be in continuous open fluid communication with (and exposed to) ambient surroundings, such as air.

Oxygen is extracted from the (oxygen source) fluid at the first end. The oxygen repeatedly undergoes an increase (step-up) in pressure as it passes through the stack. The generated dry oxygen at a higher pressure is output through one or more outlets at the other (outlet or discharge) chamber end. Except for the inlets and outlets, an exemplary chamber is hermetically sealed during the oxygen pressurization process. The exemplary chamber and stack arrangement allows for production of high-purity high-pressure oxygen.

In some embodiments an outlet port of the pump chamber can be in fluid communication (via a valve) with a suitable high-pressure gas storage receptacle (e.g., a gas holding tank). Pump operation causes a continuous flow of high-purity oxygen into the tank. The pump operation also causes the pressure inside the tank to increase with the delivery of compressed oxygen. The operation can be conducted continuously until the tank has reached a desired high-pressure level of the oxygen.

In some embodiments the arrangement may be operated in a batch mode. Pressurized oxygen may be collected and stored in the chamber itself. The oxygen can be stored near an outlet port until it is later transferred therefrom. That is, generated pressurized oxygen can be held in an oxygen-holding storage area at the discharge end of the chamber until the desired batch of oxygen (e.g., of a final pressure and volume) is achieved. An outlet valve that is in fluid communication with the oxygen storage area can then be opened to remove the batch of pressurized oxygen from the chamber. Another batch of high-purity high-pressure oxygen can then be generated in the chamber. The ability of exemplary arrangements to be operated in a continuous or a batch mode may be useful in some applications.

Each cell of the exemplary arrangement includes an oxygen-ion conducting solid-state electrolyte membrane sandwiched between cathode and anode sides. Each cell is used to carry out a single stage of the multi-stage process. At each respective stage, oxygen ions are electrochemically pumped through the respective cell of that respective stage. At the cathode side, oxygen is dissociated into oxygen ions. These oxygen ions can then migrate across the membrane. The migrated oxygen ions can then recombine at the anode side to form oxygen.

In an exemplary embodiment each stage of the process can incrementally pressurize oxygen. The extent of pressurization can vary depending on the application from as low as about 0.1 atmospheres (atm) but will more commonly be on the order of approximately 0.2 to 2.0 atmospheres (atm) and may be on the order of 10 atmospheres. Oxygen pressure is increased in each process stage by application of voltage during the stage. The stage steps include dissociating oxygen (at a relatively lower pressure) into oxygen ions on one (first) side of a cell, conducting the ions through the electrolyte, and then recombining the ions to reform oxygen (at a relatively higher pressure) on the other (second) side of the cell.

The outer edges of each of the cells are sealed. For example, in some arrangements a hermetic glass-ceramic seal can be used. In other arrangements other seal types may be used, including but not limited to, ceramic cements, metallic seals, brazed connections or other suitable sealed connections. Thus, recombined oxygen cannot escape from the circumferential outer (disk) edge of a cell. Being blocked by the cell edge sealing and the membrane, the recombined oxygen (gas) can only proceed in the direction (e.g., upward) toward the cathode side of the next immediately adjacent (higher) cell layer. The process is repeated throughout the entire stack. The recombined oxygen gets sequentially passed from one (prior) cell stage to the next cell stage, where each sequential stage further increases the oxygen pressure. As the oxygen is pumped (pushed) through the stack, the outer edges of successive cells are progressively subjected to higher pressure. As a result, the sealed outer edge of the last cell in the stack will receive the highest pressure, whereas the sealed outer edge of the first cell will be subject to the least pressure. The final (highest) pressure of the pressurized oxygen is reached after the last stage is completed.

For ease of understanding an exemplary multi-stage electrochemical pump device for the oxygen generator will be described at both the cell level (e.g., FIG. 1) and the stack level (e.g., FIG. 2). Each stack (or core) comprises a plurality of solid oxide electrolysis (SOE) cells. In an exemplary embodiment each cell (and stack) has a diameter of approximately 2 inches. Of course in other embodiments other dimensional sizes and cell numbers may be used.

Each cell includes an oxygen-ion conducting ceramic membrane located (sandwiched) between two electrode layers (anode and cathode). In the exemplary embodiment the membrane electrolyte comprises yttria stabilized zirconia (YSZ). The electrode layers comprise a tapered porous YSZ structure or other porous electrode structure, with an electro catalyst deposited on the microstructure surfaces. Alternative arrangements may include other types of membrane electrolytes such as doped ceria. This may include for example, gadolinium or samarium doped ceria. As discussed in more detail later, exemplary oxygen generators/pumps allow for different catalysts to be used with (or tailored to) different electrochemical reactions. In some exemplary embodiments, the stacks can include solid oxide cells that comprise cell materials, structures, sizes and/or features of the types described in U.S. Pat. No. 7,534,519 and/or U.S. Pat. No. 4,877,506, which are herein incorporated by reference in their entirety. Alternatively, instead of the cell electrodes having the tapered porosity of the incorporated disclosures example arrangements may use other types of porous electrode structures.

As used herein, high-purity oxygen, substantially pure oxygen, and essentially pure oxygen each refer to an oxygen content level that is greater than approximately 90%, with a preferred level being ≥99.5%, and more preferably in the range of 97-99%. As used herein, high-pressure oxygen refers to pressure in the approximate range of 1000-3000 psia. However, it should be understood that some arrangements may produce oxygen at elevated pressures below 1000 psia.

An exemplary electrolysis process involving the electrochemical pump will now be described. A potential is applied across each individual cell in the stack of cells. The electrical potential optimally applied is a function of the electrolyte thickness and conductivity as well as temperatures. The electrical potential may range in some embodiments from 0.1 to 2.2 volts and most commonly in the range of 1.5 to 2.0 volts. Operational temperature in embodiments using YSZ membrane electrolyte is greater than 450° C. to ensure adequate oxygen-ion conductivity in the ceramic membrane, and in some arrangements 600-1000° C., Alternatively, arrangements using other types of membrane electrolyte may operate at other temperatures, for example arrangements using doped ceria electrolyte, may operate preferably at temperatures in the approximately 450-600° C. range. An oxygen-containing fluid is supplied to the cathode side of the first (lowest, entrance) cell of the stack. The fluid can be received into the chamber through at least one fluid inlet port. The particular fluid supplied at the cathode side allows for a reaction to be carried out in which (negative) oxygen ions ($O^{2-}$) are produced.

A plurality of different (oxygen source) fluid compositions (e.g., most commonly air, water and/or carbon dioxide) can be used to supply the oxygen to the stack. Of course oxygen containing gas mixtures other than air may be used as well. Each of the usable fluids can be dissociated to enable the production of $O^{2-}$. For example, carbon dioxide ($CO_2$) can be dissociated into carbon monoxide (CO) and $O^{2-}$ according to Equation I. Also, (ambient) air can be dissociated into $O^{2-}$ according to the Equation II. Water vapor can be dissociated into hydrogen gas ($H_2$) and $O^{2-}$ according to Equation III.

$$CO_2 + 2e^- \rightarrow CO + O^{2-} \qquad \text{Equation I}$$

$$\tfrac{1}{2}O_2 + 2e^- \rightarrow 2O^{2-} \qquad \text{Equation II}$$

$$H_2O + 2e^- \rightarrow H_2 + O^{2-} \qquad \text{Equation III}$$

Figure 5:
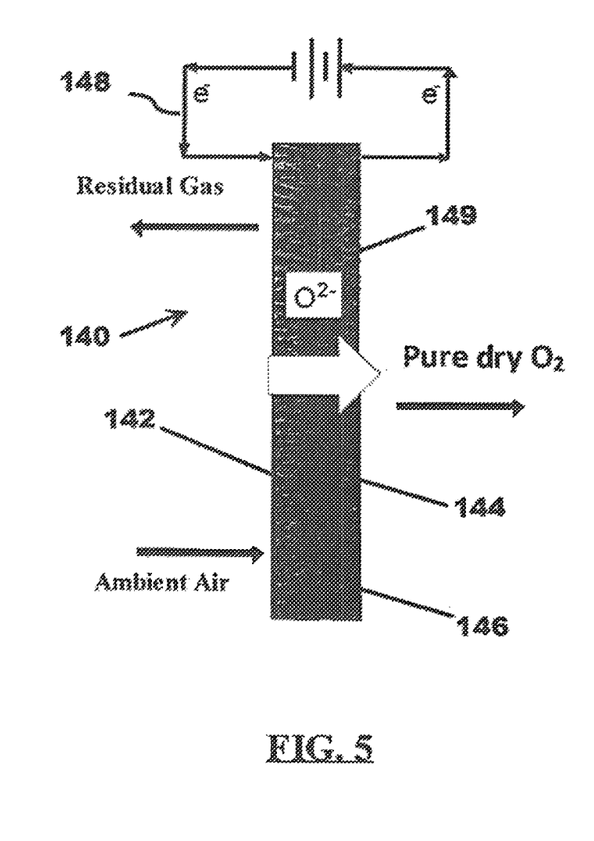
FIG. 5 illustrates another embodiment, which includes an exemplary electrolysis cell that can provide oxygen from ambient air.

FIG. 5 shows an exemplary cell level arrangement in which a (entry) cell 140 is used to obtain oxygen from ambient air, in accordance with Equation II. The solid oxide electrolysis cell 140 includes a (air) cathode 142, an ($O_2$) anode 144, and a (YSZ) membrane electrolyte 146. Electric wiring 148 (for use in establishing the voltage potential) and a current collector 149 are also shown. $O^{2-}$ that is dissociated from the ambient air on the cathode side of the cell 140 can migrate through the electrolyte 146 to the anode side of the cell, as shown by the flow direction arrow. The cell thickness in this exemplary arrangement is approximately 1020-1050 microns, but could be thinner or thicker in other arrangements. It should be understood that the structures and dimensions presented herein are exemplary, and that in other embodiments other arrangements dimensions (and various sizes) can be used.

As discussed in more detail later, the cell 140 may be used as the first (initial or entry) cell of a stack. The first cell is exposed to the oxygen-containing fluid (i.e., air in FIG. 5).

Figure 2:
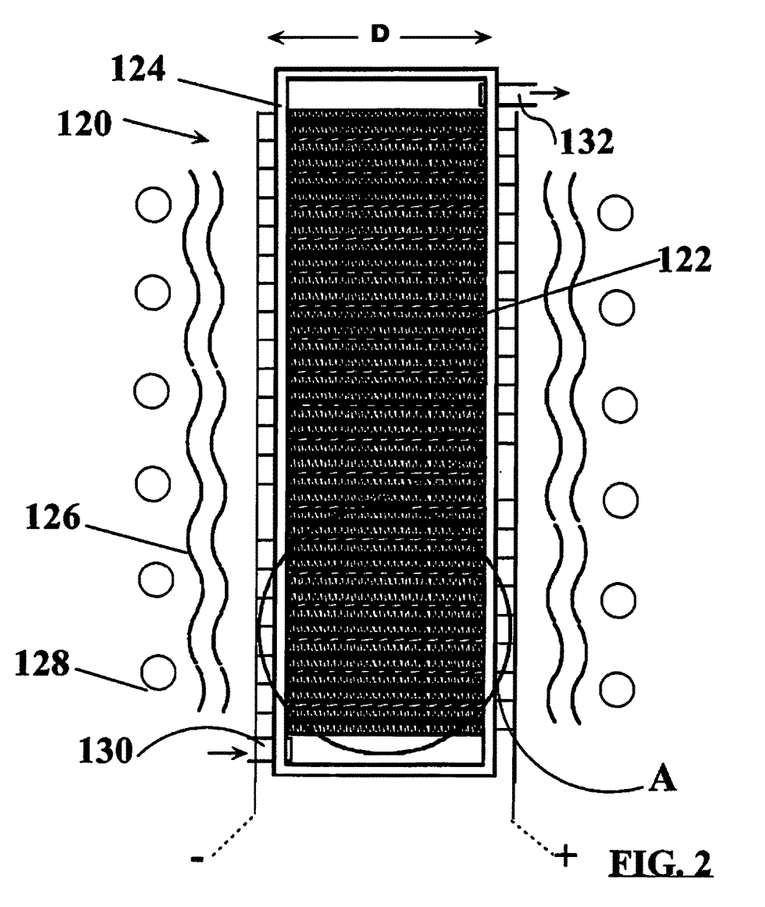
FIG. 2 illustrates an exemplary high-purity high-pressure oxygen generator that comprises a multi-stage electrochemical oxygen pump including a stack of the electrolysis cells.

FIG. 2 shows an exemplary pump arrangement. The arrangement includes a pump 120. The pump 120 comprises a stack 122 formed of a plurality of cells 140, like the cell shown in FIG. 5. In an exemplary embodiment each of the stacked cells 140 is substantially identical.

The entire stack of this exemplary arrangement is housed in a cylindrical shell (or chamber housing) 124. The shell 124 is encased in at least one outer layer of insulation 126. Heating elements 128 are also shown. The stack of this example is operable at temperatures greater than 600° C. The diameter D in this example is approximately 2 inches.

In an exemplary embodiment the shell 124 comprises a multi-layer Ceramic-Matrix-Composite (CMC) fiber reinforced shell. The outer circular edge of each cell is hermetically sealed by a seal arrangement 136, such as a glass-ceramic seal. The hermetic sealing of this arrangement extends across the plurality of cells and throughout the length of the stack.

As shown in FIG. 2, a source of oxygen-containing fluid (i.e., air) at a low entry pressure (e.g., ambient pressure) can enter the shell 124 through an inlet 130. High-purity $O_2$ provided at a high pressure (relative to the entry pressure) can exit the shell through an outlet 132. For example, air at $P_{Low}$ can be received by the stack, the separated $O_2$ can be pumped up in pressure as it passes through the stack, and then high-purity $O_2$ at a final $P_{High}$ can be released from the stack.

Figure 1:
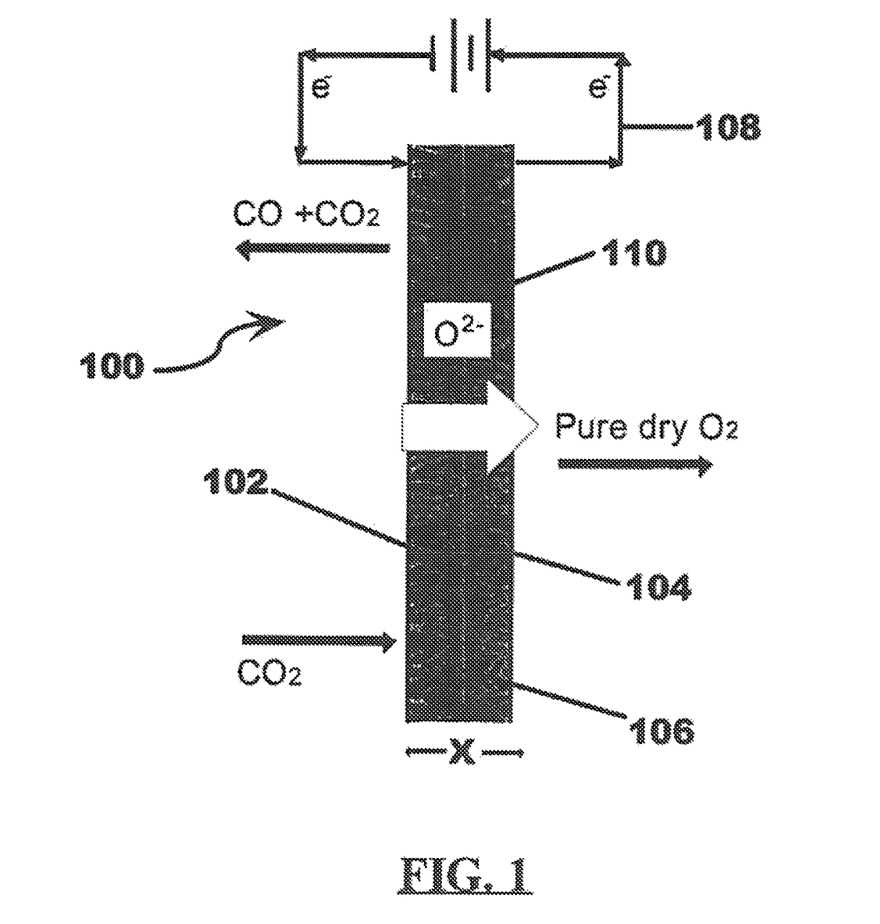
FIG. 1 illustrates an exemplary arrangement comprising a solid oxide electrolysis cell, which is usable in providing oxygen from $CO_2$.
Figure 3:
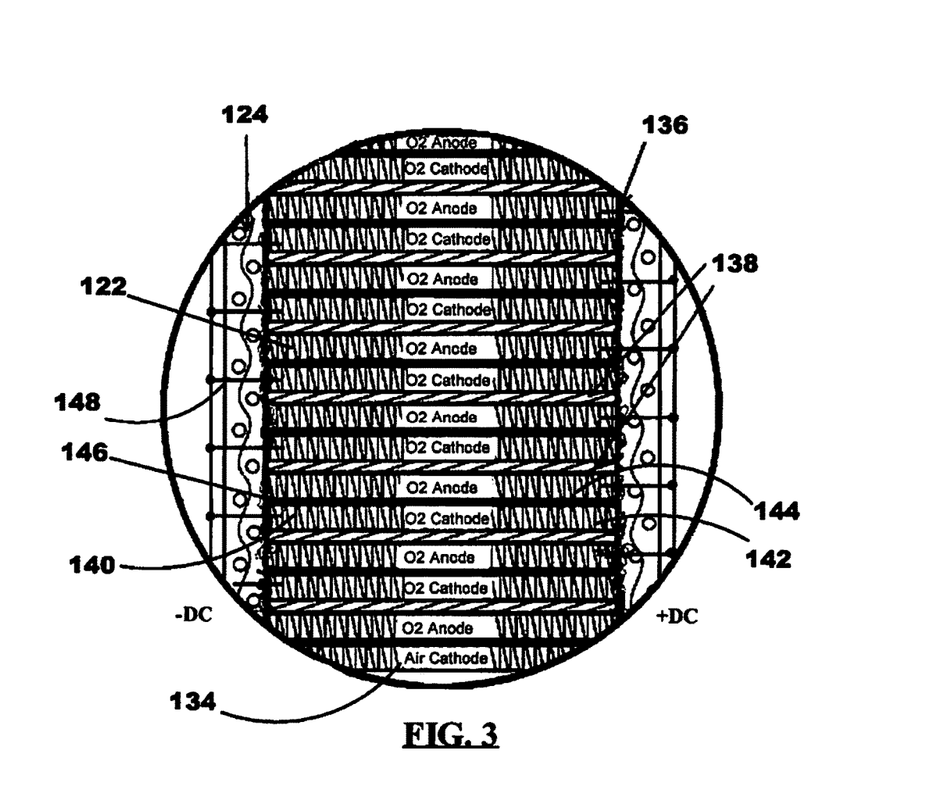
FIG. 3 illustrates an enlarged section of the oxygen generator shown in FIG. 2.

FIG. 3 shows an enlarged view of the circular area indicated by the "A" in FIG. 2. As can be seen from FIG. 3, the cathode side of the first cell 134 is the entry point (or area) of the stack 122. That is, in the example of FIG. 3 the bottom cell 134 in the stack functions as the entry cell, which gets exposed to the oxygen-containing fluid. As shown in FIG. 1, this first cell 134 (like the cell 140) includes an entry side cathode (which can function as a air exposed cathode), an electrolyte (e.g., a YSZ electrolyte membrane), and an anode (which can function as an $O_2$ anode). Each of the remaining cells 140 in the stack 122 include a cathode (or first) side cathode (which can function as an $O_2$ cathode), an electrolyte, and an anode side anode (which can function as an $O_2$ anode).

As indicated by FIG. 5 and FIG. 3, each cell 140 can be connected by wired connections 148 in parallel. As discussed later in further detail, in an exemplary embodiment the adjacent cells 140 in the stack 122 are electrically separated from each other by an insulating layer 138. In an example arrangement the insulating layer may be comprised of zirconia cloth. In other arrangements cells may be insulated by other electrical insulators including but not limited to ceramic insulators such as porous structures comprised of alumina, which has both electrical and ionic insulating properties. Of course in other arrangements, other structures and materials may be used.

Figure 4:
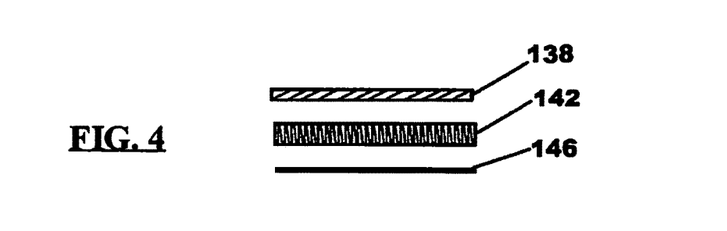
FIG. 4 illustrates identifiers for certain materials shown in FIG. 3.

FIG. 4 indicates representative drawing symbols for some of the pump components presented in FIG. 3, such as insulating layer 138, electrodes 142, 144, and electrolyte 146.

Although the pump arrangement has been shown in a vertical orientation in FIG. 2, it should be understood that the pump operation can be carried in other orientations in other embodiments. Also, although the stack (and shell/housing) are shown as having a cylindrical configuration, it should be understood that other configurations (including non cylindrical) can be used in other embodiments.

The exemplary pump arrangements allow for use of deposited electrode catalysts that are specifically tailored to the particular electrochemical reactions being used. For example, for the $CO_2$ electrolysis (Equation I) or the $H_2O$ electrolysis (Equation III), the applied electrode catalyst can be a composite or cermet, such as Ni-YSZ or Ni-ceria. However, for reducing the oxygen from an air source (Equation II), the applied electro catalyst can be an oxygen reduction catalyst, such as Lanthanum Strontium Cobalt Ferrite (LSCF) or Lanthanum Strontium Manganite (LSM). Of course as previously discussed, in other arrangements other materials may be used.

Figure 6:
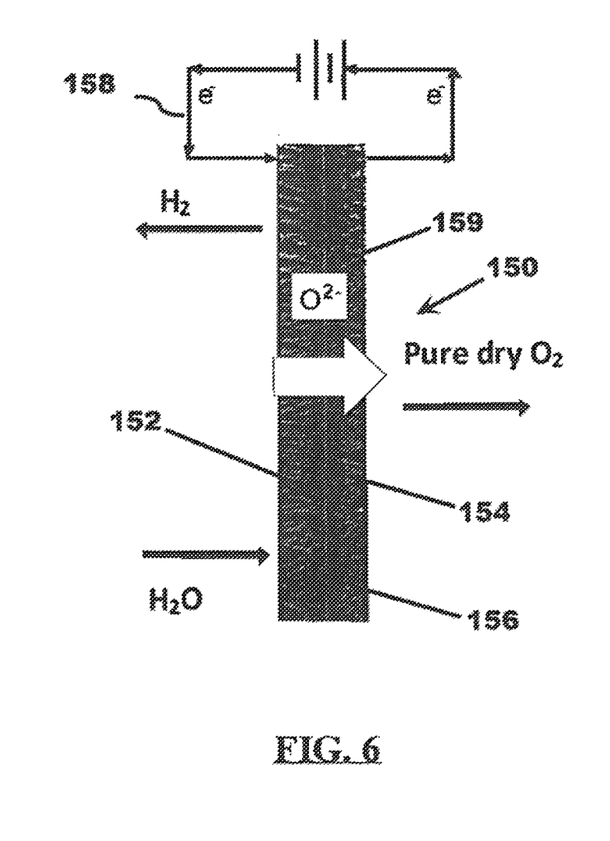
FIG. 6 illustrates a further embodiment, which includes an exemplary electrolysis cell that can provide oxygen from $H_2O$.

FIG. 6 shows another cell level arrangement. This exemplary solid oxide electrolysis cell 150 is used to obtain oxygen from $H_2O$, in accordance with Equation III. The cell 150 includes a ($H_2O$) cathode 152, an ($O_2$) anode 154, and a (YSZ) electrolyte 156. Electric wiring 158 and a current collector 159 are also shown. The $H_2O$ may be in the form of a water vapor. $O^{2-}$ dissociated from the $H_2O$ can migrate through the electrolyte 156 to the anode side, as represented by the flow direction arrow. A plurality of substantially identical cells 150 can be arranged in fluid connected engagement to form a multi-stage electrolysis stack in an electrochemical pump that pressurizes oxygen.

FIG. 1 shows an example of a cell level arrangement in which a solid oxide electrolysis cell 100 is used to obtain oxygen from carbon dioxide, in accordance with Equation I. The cell 100 includes a ($CO_2$) cathode 102, an ($O_2$) anode 104, and a (YSZ) electrolyte 106. Electric wiring 108 and a current collector 110 are also shown. Dissociated $O^{2-}$ can migrate through the cell 100 in the flow direction of the arrow, from the cathode side toward the anode side. The cell thickness X is in this exemplary embodiment is in the range of approximately 1020-1050 microns. The cells can be arranged in the manner shown in FIG. 2 to produce an electrochemical pump arrangement that produced oxygen at elevated pressure.

Returning to a discussion of the exemplary operational process, in these exemplary arrangements the $O^{2-}$ ions produced at the cathode side of the first cell can diffuse across the electrolyte material to the anode side. The remaining residual byproducts (e.g., unwanted gas) from the dissociated fluid introduced on the cathode side of the first cell in the stack, are expelled or removed from (and replaced at) the cathode side, such as by additional (inflowing) fluid. The unwanted residual byproducts can be exhausted from the chamber through one or more ports. For example, removal of unwanted byproducts can be carried out to rid generated CO (resulting from Equation I) and generated $H_2$ (resulting from Equation III).

In some example embodiments the cathode side of the first (lowest, entry) cell of the stack can be in open fluid communication with the ambient surroundings (e.g., air). For example, such an open-ended chamber may be absent any designated fluid inlet opening. Other embodiments can also be used for supplying sufficient quantities of source oxygen to the stack. For example, oxygen at elevated pressures may be produced by providing oxygen alone to the first cell in the stack. The pressure of the oxygen will then be elevated from the starting pressure as it is moved successively through the cells of the stack.

Regardless of the particular structural configuration of the chamber, the produced $O^{2-}$ ions are provided within a sufficient (close) distance of the cathode so that they are electrically prone to begin crossing the electrolyte to the anode side. The $O^{2-}$ ions that migrate across the membrane recombine at the anode side to form oxygen gas. At the anode (oxygen) electrode the oxide ions coming from the electrolyte give up electrons in forming oxygen gas. That is, ionized oxygen that traveled through the electrolyte is converted to oxygen gas at the oxygen anode electrode. The anode involved in the oxygen recombination reaction can comprise an oxygen reduction catalyst. The oxygen gas can be formed according to Equation IV.

$$2O^{2-} \rightarrow O_2 + 4e^- \qquad \text{Equation IV}$$

As previously discussed, the YSZ membrane electrolyte of the example arrangement is configured to only conduct oxygen ions. Furthermore, because of the applied voltage arrangement the oxygen ions are only conducted one-way. Thus, the very first stage of the electrochemical pumping process of the example arrangement essentially pure dry oxygen is produced on the anode side of the first cell.

The oxygen pressure can be increased on the anode side of each cell by increasing the voltage across the cell. The pressure increase can be achieved in accordance with principles of the well known Nernst equation:

$$V = \frac{RT}{4F} \ln \frac{P_{O_2}(\text{anode})}{P_{O_2}(\text{cathode})}$$

where
V is the voltage across the cell
R is the ideal gas constant
T is the temperature
F is Faraday's constant
$P_{O_2}$ is the partial pressure of oxygen As previously discussed, in the exemplary process each cell receives a potential in the range of 0.1 to 2.2 volts and most commonly 1.5 to 2 volts. The voltage used optimally is generally dictated by electrolyte thickness and conductivity as well as temperature. Accordingly, this enables each individual stack stage to provide (or contribute to) an incremental pressurization (higher pressure) of oxygen as a function of the voltage applied. Most commonly in exemplary arrangements the pressure increase is in the range of 0.2 to 2.0 atm per cell stage in the stack but may be 10 atm. That is, in terms of pounds per square inch, each stage can as controlled, may produce an additional (further) increase in the oxygen pressure in the approximate range of 2.7 to 27 psia and may be 150 psia. In the exemplary process the stack is configured so that each separate stage causes the substantially same increase in pressure. Of course in other arrangements cells may produce different increases in pressure as desired. This may be done, for example, by varying the voltages that are applied to the cells.

Using 10 atm as an example increase in pressure per cell stage, the oxygen pressure following completion of the next stage will be greater by approximately 10 atm. That is, performing this next stage will result in a new pressure that is substantially equal to the current stage pressure plus another 10 atm. For example, if the oxygen pressure is 50 atm as a result of the prior stage completion, then completion of the immediately next stage will result in the oxygen pressure being 60 atm. Each sequential next stage in the example adds another 10 atm to the oxygen pressure. Each added 10 atm is cumulative over the entire stack, resulting in a generated final pressure. Thus, the exemplary pump can be operated as a pressure compounding (or intensifying) device.

As can be seen, the exemplary oxygen pressurizing pump embodiments allow for the final oxygen pressure generated to be directly based (or dependent) on the number of stages that are included in the device as well as the voltages applied to each cell in the stack. There is a correlation between the total number of stages in a stack and the maximum oxygen pressure that can be generated by that stack. Completing a greater number of stages will result in a greater (higher) level of pressurized oxygen. Likewise there is a correlation between the voltage that is applied to each cell and the increase in pressure achieved by each cell.

As can be appreciated, the exemplary embodiments enable production of pure oxygen at a particular high-pressure level by using a particular sized stack (of a predetermined number of cells). For example, an exemplary high-pressure oxygen generator can be used to provide pressurized oxygen at pressure approaching 2500-3000 psia by employing a stack of approximately 35 cells, where each cell stage can increase the oxygen pressure by up to approximately 85 psia. It should be understood that other exemplary generator/stack arrangements can provide other values of pressurized oxygen.

As previously discussed, an exemplary electrochemical pump utilizes a multi-stage arrangement that includes cells that are stacked in a series configuration. In an exemplary arrangement a potential of 1.5 to 2 volts is applied across each cell. The membrane electrolyte in each cell comprises a YSZ layer. The chamber configuration allows each of the stacked cells to be kept electrically insulated from each other by having a respective insulating layer located between all adjacent cells in the stack. For example, a non-electronically conducting ceramic woven cloth-like layer may extend between adjacent cells in the stack being to maintain them separated from each other.

Each cell in the stack is individually wired in a manner that limits the voltage difference across each individual cell. For example, each of the cells can be wired in parallel. With the cells being wired in parallel, the voltage difference across each cell can be easily controlled to avoid electrochemical reduction of the electrolyte. The sealed cell edges allow for feedthroughs for the current-carrying wire leads (e.g., platinum) to each individual cell. As can be appreciated, the exemplary pump embodiment provides a stack configuration that avoids a large total voltage differential across any individual cell stage.

Furthermore, because the exemplary pump does not use high voltage potentials across any cell, the cell's electrolyte will have a much longer life. That is, the configuration and operation of the exemplary pump prevent its electrolyte material from being quickly chemically reduced and decomposed. As can be appreciated, the example pump configuration does not allow the material properties of cell electrolyte to undergo a rapid detrimental change, especially with regard to ionic conducting ability.

The exemplary multi-stage pump also allows each stage to provide a substantially same incremental pressurization of oxygen, such as the 0.2 to 10 atm described in the example. Thus, the multi-stage stack arrangement allows each cell to have a low differential pressure across the cell membrane. As can be appreciated in the example arrangement, a large differential pressure across any individual cell is avoided, which also contributes to longer cell life.

The total number of stages to be provided within a particular stack and the voltage applied to the cells can be based on the particular final pressure needed to be generated by that stack. Thus, the exemplary pump embodiment additionally allows for different stack sizes and voltages to be used to meet different pressurized oxygen applications or requirements.

The exemplary pump embodiment enjoys the ability of an all solid-state device that can separate oxygen from air and other materials, and then electrochemically pump the oxygen in a multi-stage process to produce high-purity high-pressure oxygen. The exemplary device utilizes an oxygen-ion conducting solid-state membrane. Unlike a rotary or reciprocal compressor, the exemplary solid-state device requires no moving parts to compress the oxygen. With no moving parts the solid-state device provides increased reliability and minimum maintenance.

Furthermore, because the exemplary device generates high-purity oxygen, there is no need for the produced oxygen to undergo any extra separation processes to purify the oxygen. Also, the high operating temperatures of the device (>600° C. in the example arrangement) assures sterility of the generated oxygen. Thus, high-purity high-pressure oxygen that can be created by the exemplary device can be used in life support and medical applications.

Furthermore, the exemplary pump device can generate dry high-purity oxygen from ambient sources, including air or water which contains impurities or other debris. The pump arrangement is configured to resist fouling from such impurities. In contrast, other water electrolysis technologies are limited by requiring a high-purity water source.

The exemplary pump embodiment further enjoys a stack configuration that is based on a bi-supported cell arrangement. With the exemplary arrangement support is improved because the cell membrane (solid-state electrolyte) is structurally supported by both (cathode and anode) electrode layers. Additionally, improved hermetic sealing is provided at the outer edges of the stacked (cylindrical) cells. Thus, the exemplary arrangement also avoids need for a compression sealing mechanism or other (mechanical) spring-loaded hardware.

In the exemplary pump embodiment the chamber, which houses the multi-stage stack, structurally serves as a pressure containment vessel. The exemplary chamber comprises one or more outer sealing layers of ceramic matrix composite (CMC). The chamber configuration causes the entire stack to be wrapped in a multi-layer CMC reinforced fiber shell, which provides the pressure containment. The exemplary shell is structurally capable of securely containing the high-pressure oxygen gas that gets generated therein.

The exemplary pump embodiment further includes the shell being encased in an outer insulator layer. For example, the layer can be high temperature insulation wool (e.g., aluminosilicate fibers) or a high temperature aerogel material. The aerogel may be used for application of the pump in space. In other examples other types of insulating layers may be used.

The exemplary pump can also include heating elements. For example, the heating elements can be electrical heating elements embedded near the inner wall of the insulation layer. The heating elements can assist in initial start-up of the exemplary pump/generator. The heating elements can also be operated to provide supplemental heat as needed to maintain a constant operating temperature (e.g., 450-1000° C.).

The described exemplary apparatus and method for generating high-pressure oxygen may be beneficially used in a wide range of applications. As previously discussed, oxygen is needed for space applications. For example, oxygen is necessary for Extra-Vehicular Activities (EVAs), such as space walks and manned rover exploration. The International Space Station (ISS) crew requires EVA suits in order to install and maintain hardware and science payloads external to the ISS. The oxygen may also need to be dry and of high-purity. For these space applications storage space is very limited, which dictates the requirement that oxygen be stored at high-pressure. Typically, high-pressure oxygen is supplied to the ISS via a resupply vehicle (e.g. SpaceX, Progress) from Earth. This oxygen supply method requires extra resupply mass and its associated launch costs.

Furthermore, as NASA looks to longer duration space missions (e.g., to Mars), the ability to generate dry high-purity high-pressure oxygen on-site (as opposed to resupply from the Earth) is likely to be a critical enabling technology. Mechanical pressurization of oxygen continues to be incompatible with space applications due to such factors as moving parts (resulting in vibration, lower reliability, etc.) and impractical power, mass, and volume requirements. Also, oxygen produced by other methods must often be dried in order for it to be liquefied for long-term storage, else a small amount of water vapor may damage valves or other components in cryogenic liquefaction systems. Other electrolysis technologies, such as Polymer Electrolyte Membrane (PEM) and alkaline electrolyzers, generate oxygen with small amounts of water vapor in the product stream. As can be appreciated, the exemplary apparatus and method overcomes these problems by providing a novel ability to generate dry high-purity high-pressure oxygen on-site during space missions.

An exemplary embodiment includes a pump controller. The controller includes at least one processor. The controller is programmed to automatically control generating batches of high-pressure oxygen. The controller is operatively connected to receive signals that correspond to pressure data sensed by pressure detectors. These pressure detectors (sensors) are associated with a pressure holding area, such as a high-pressure gas storage tank. The pump feeds pressurized oxygen to the tank through an outlet port associated with a valve that is operated (open/close) by the controller. Thus, the pressure detectors can be located inside the pump housing adjacent the outlet port. All aspects of pump operation, including the level of voltage applied across the individual cells of the stack, is handled by the controller.

In some embodiments an inlet port of the chamber housing may include a valve which controls the amount and flow of oxygen-containing fluid that reaches the stack. Such an inlet valve would also be controlled by the pump controller.

Based on data sensed by the pressure detectors, the controller determines whether a pressurized oxygen batch is completed. Upon such determination the controller can close the outlet valve and cease supply of voltage to the stack. The controller is programmable to allow a person to set the desired high-pressure level. That is, the controller can be set to generate pressurized oxygen at a predetermined pressure level.

In another pump control embodiment, a pump controller is in operative connection with oxygen level sensors. The sensors can wirelessly communicate sensed data, which is obtainable by the controller. The sensors may be located on an exterior of the chamber and/or in a room at a location that is spaced from the chamber. The controller is operable to automatically control the pump to maintain a proper level (percentage) of oxygen in the air in the room. For example, following a controller decision (based on data from the sensors) that the oxygen content in the room area has dropped below a predetermined (low) level, the controller can start the pump to generate high-purity oxygen on a continuing basis, with the release, which is released to the room. The controller can cease pump operation upon determining (based on sensor data) that the room contains a proper oxygen percentage. The proper percentage may be a set (much higher) level above the predetermined (low) level. The controller can make the determinations (and control the pump) in real time.

The pump arrangement can be configured such that the stack is open at both ends to the room air. Thus, as high-purity oxygen is generated it is automatically released into the room. In other arrangements the chamber housing may have an outlet valve, which can be operated (opened/closed) by the controller to simultaneously release a generated batch of high-purity oxygen. The exemplary controller is programmable, which allows the set points for pump on and pump off oxygen percent levels to be received as user input. That is, the controller can be set much like a room thermostat.

Although the exemplary arrangements have been described based upon certain embodiments, a wide array of modifications, variations, and alternative constructions are also within the spirit and scope of the principles described herein. Example arrangements for generating high-pressure oxygen via electrochemical pumping in a multi-stage electrolysis stack have been described herein with reference to particular components, features, properties, attributes, relationships, and methods. However, it should be understood that in other embodiments other arrangements may include other components, features, properties, attributes, relationships, and/or methods which provide similar capabilities and functionality.

It will be readily understood that the features of exemplary embodiments, as generally described and illustrated in the Figures herein, can be arranged and designed in a wide variety of different configurations. That is, the features, structures, and/or characteristics of embodiments or arrangements described herein may be combined in any suitable manner in one or more other embodiments or arrangements. Thus, the detailed description of the exemplary embodiments of apparatus and method, as represented in the attached Figures, is not intended to limit the scope of the invention as claimed, but is merely representative of selected exemplary embodiments that implement the principles described herein.

In the foregoing description, certain terms may have been used to describe example arrangements for purposes of brevity, clarity, and understanding. For example, certain terms like "upward", "downward", "higher", "lower" "left", "right", "outer", "inner", "front", "rear", "top", and "bottom" may have been used. However no unnecessary limitations are to be implied therefrom because such terms have been used for descriptive purposes and are intended to be broadly construed. The terms are not to present limitations on the scope of the exemplary embodiments, as defined by the claims hereof. Moreover, the descriptions and illustrations herein are by way of examples and the inventive teachings are not limited to the specific details shown and described.

The novel structure, along with the methods of preparing and using the novel structure, achieves at least one of the above stated objectives, eliminates difficulties encountered in the use of prior devices and systems, solves problems, and attains the desirable results described herein.

In the following claims, any feature described as a means for performing a function shall be construed as encompassing any means capable of performing the recited function, and shall not be limited to the particular means used for performing the function in the foregoing description, or mere equivalents.

Having described the features, discoveries and principles of the invention, the manner in which it is constructed and operated and the advantages and useful results attained, the new and useful structures, devices, elements, arrangements, parts, combinations, systems, equipment, operations, methods, processes, and relationships are set forth in the appended claims.

The invention claimed is:

1. An apparatus comprising:
   a plurality of electrochemical cells arranged in a stack, each electrochemical cell comprising:
      a cathode;
      an anode;
      an oxygen ion conducting electrolyte; and
      a current conducting layer;
   a hermetically sealed outer edge perimeter of the stack;
   each electrochemical cell is individually wired in parallel;
   wherein when a voltage is applied to the stack, the stack is operable in carrying out multi-stage pressurization of oxygen from a low pressure stage to a high pressure stage.

2. The apparatus of claim 1, wherein the stack includes a plurality of solid oxide electrolysis cells.

3. The apparatus of claim 2, wherein each electrochemical cell further comprises a solid electrolyte sandwiched between a cathode layer and an anode layer.

4. The apparatus of claim 3, wherein the electrolyte comprises yttria stabilized zirconia (YSZ) or other selective oxygen conducting material.

5. The apparatus of claim 4, wherein respective adjacent electrochemical cells in the stack are separated from each other by a respective insulator layer.

6. The apparatus of claim 5, wherein the respective insulator layer electrically isolates a first adjacent cell of the respective adjacent cells from a second adjacent cell of the respective adjacent cells.

7. The apparatus of claim 6, wherein the respective insulator layer allows diffusion of oxygen gas therethrough.

8. The apparatus of claim 7, wherein the hermetically sealed outer edge perimeter requires that oxygen gas from an anode side of the first adjacent cell pass through the respective insulator layer in order to reach a cathode side of the second adjacent cell.

9. The apparatus of claim 8, wherein the stack of electrochemical cells performs a multi-stage pressurization of oxygen from a low pressure stage to a high pressure stage wherein the pressure increases in successive cells throughout the stack so that the final electrochemical cell provides an output of high purity, pressurized oxygen.

10. The apparatus of claim 4, wherein the electrolyte comprises a selective oxygen conducting ceramic.

11. The apparatus of claim 10, wherein the seal arrangement comprises a glass-ceramic or glass composite seal arrangement.

12. The apparatus of claim 11, wherein each electrochemical cell of the stack is one pumping stage of the multi-stage pressurization of oxygen.

* * * * *